United States Patent

[11] 3,585,849

| [72] | Inventor | Bernard Grolman<br>Worcester, Mass. |
|---|---|---|
| [21] | Appl. No. | 766,189 |
| [22] | Filed | Oct. 9, 1968 |
| [45] | Patented | June 22, 1971 |
| [73] | Assignee | American Optical Corporation<br>Southbridge, Mass. |

[54] METHOD AND APPARATUS FOR MEASURING INTRAOCULAR PRESSURE
7 Claims, 5 Drawing Figs.

[52] U.S. Cl. .................................................. 73/80
[51] Int. Cl. .................................................. A61b 3/16
[50] Field of Search .......................................... 73/80; 128/2

[56] References Cited
UNITED STATES PATENTS

| 3,181,351 | 5/1965 | Stauffer ........................ | 73/80 |
| 3,232,099 | 2/1966 | Motchenbacher ........... | 73/80 |
| 3,304,769 | 2/1967 | Stauffer ........................ | 73/80 |

OTHER REFERENCES

" Feasibility Study of a Non-Contacting Tonometer," H. E. Guttman, SAN DIEGO SYMPOSIUM FOR BIOMEDICAL ENGINEERING, June 19—21, 1962, pp. 300—303.

Primary Examiner—Richard C. Queisser
Assistant Examiner—C. E. Snee, III
Attorneys—William C. Nealon, Noble S. Williams and Robert J. Bird ABSTRACT: An air pulse is directed at the cornea of a patient's eye, causing it to deform from its normal convex shape through application and to a slight concavity. The intraocular pressure thereupon causes the return of the cornea from concavity through application to a normal or convex shape. The time interval between occurrences of application, or between a fixed point in time and either occurrence of application, is a measure of intraocular pressure. Apparatus for the practice of this invention includes an air pulse generator to provide a cornea-depressing pulse of air, a source of light and means to direct the same onto the corneal surface, a photodetection means to sense specularly reflected flux from the cornea, and instrumentation to show, as a function of time, the occurrences of reflected light flux maxima.

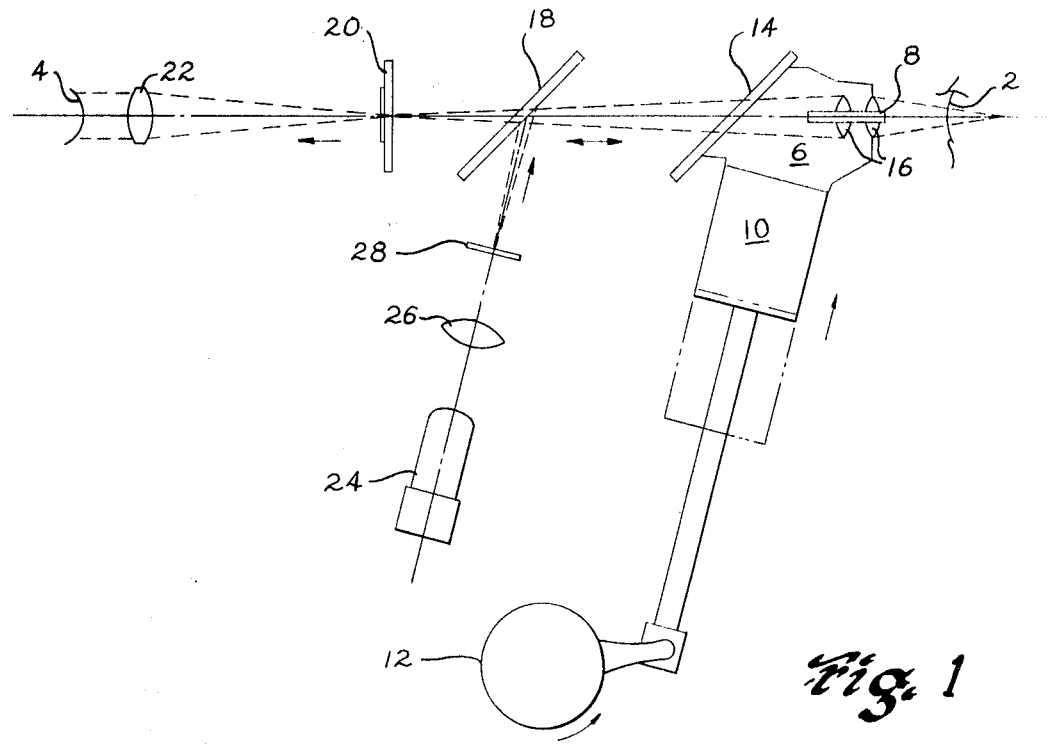
Fig. 1
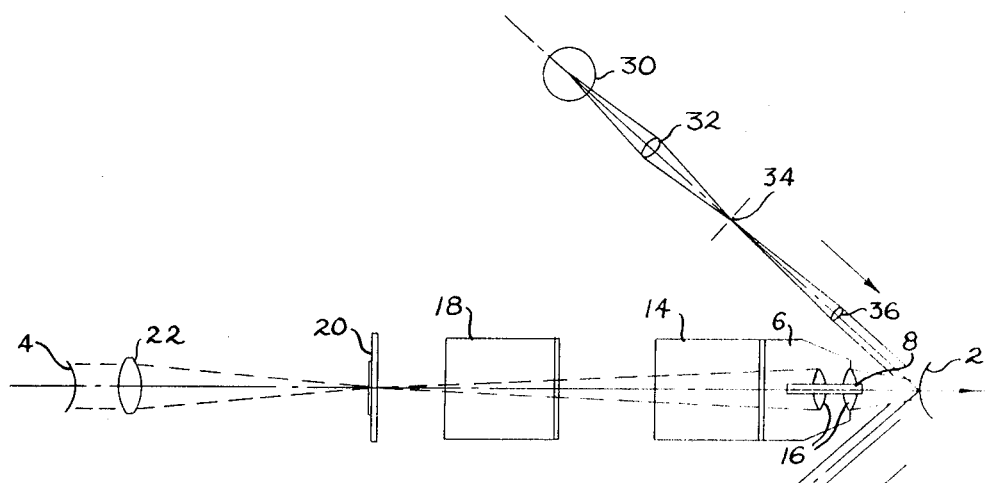
Fig. 2
INVENTOR.
BERNARD GROLMAN
BY
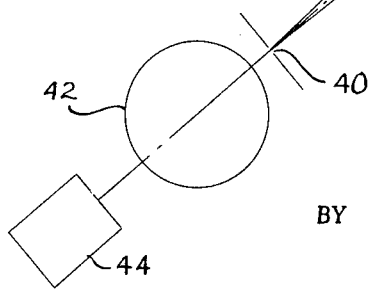
ATTORNEY

METHOD AND APPARATUS FOR MEASURING INTRAOCULAR PRESSURE

BACKGROUND OF THE INVENTION

The present invention relates to tonometry in general and more particularly to a new method and apparatus for the measure of intraocular pressure.

The prior art devices and methods in the art of tonometry have included mechanical plungers put into direct contact with the cornea to measure resistance of the eyeball to deformation. Another form of prior art tonometer and method of tonometry includes an air-puff device by which a stream of air is directed at the cornea to deform the same and then to measure the force of the pulse or the deformation resulting therefrom, such force or deformation being a measure of the intraocular pressure resisting deformation. The above-described prior art tonometers are somewhat limited by the degree of accuracy in such variables as air pressure, physical alignment of the instrument to the cornea, and measurement of corneal deformation. An even more formidable limitation of some prior art devices is that they require some form of corneal anesthesia.

It is an object of the present invention to provide a noncontact method of measuring intraocular pressure by which method a corneal area is deformed from convex through applanation to concave and allowed to return from concave through applanation to convex, the time of occurrences of applanation being calibrated as a measure of intraocular pressure.

Another object is to provide apparatus for the practice of this novel method.

Other objects, advantages and features of the present invention will become apparent from the following description of one embodiment thereof, when taken in connection with the accompanying drawings.

SUMMARY OF THE INVENTION

Briefly, the present invention includes a method and apparatus for measuring intraocular pressure by reflecting a beam of light off a corneal surface area and directing a pulse of air to deform the surface area from its normal convex shape through applanation to a concavity with the subsequent relaxation of the cornea to its normal convex configuration. During this procedure, the specularly reflected flux from the corneal surface is sensed by instrumentation as a function of time. The occurrences of applanation are indicated by maxima of the reflected flux. The relationship of one or more of these occurrences to time is related to the intraocular pressure resisting deformation and motivating the relaxation. This time relationship is calibrated as a measure of intraocular pressure.

DRAWING

In the drawing:

FIG. 1 is a somewhat schematic representation of a part of an apparatus for practicing the method of this invention and includes the pneumatic system and the alignment system thereof;

FIG. 2 is a schematic similar to FIG. 1 and in the nature of a plan view of FIG. 1 and showing the monitoring system of this apparatus;

Figure 3:
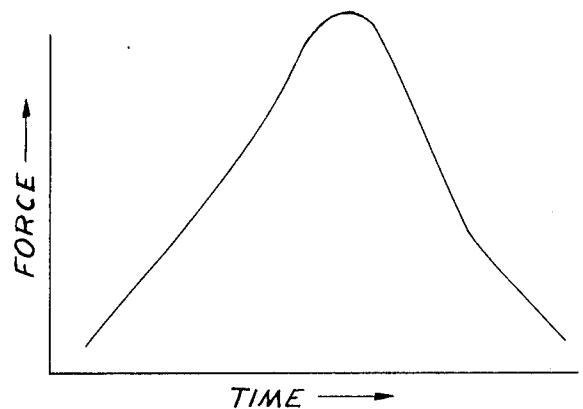
FIG. 3 is a curve of air-pulse force as a function of time, the air pulse being the input force causing corneal deformation.
Figure 4:
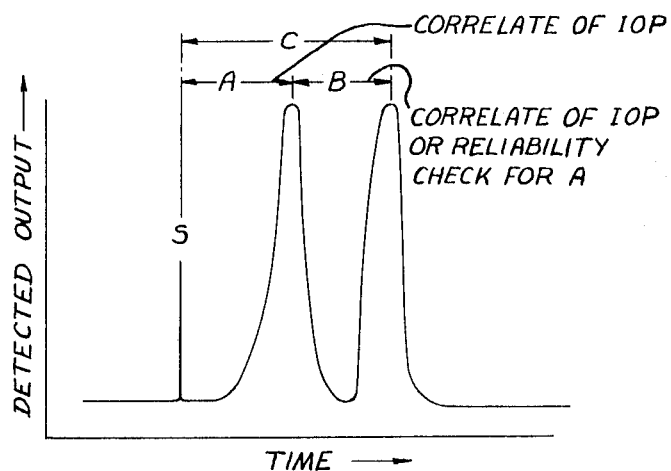
Figure 5:
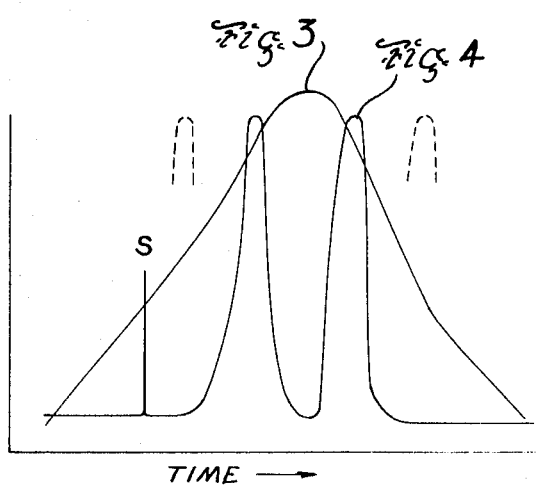

FIG. 4 is a curve of reflected light detector output signal as a function of time indicating sensed reflected light flux from a corneal surface area as the surface area passes through the phases of convexity, applanation, concavity, and reverse; and FIG. 5 is a superposition of the curve of FIG. 4 on that of FIG. 3 to show their time relationship. The abscissas of the superposed curves are identical. Their ordinates are unrelated.

DESCRIPTION

Referring now to FIG. 1, there is shown by way of environment the corneal surface 2 of the eye of a patient and the eye of an observer shown at 4. Tonometer apparatus is situated between the observer and the patient and includes a pressure chamber 6 exiting through an orifice tube 8 which is disposed normally to the corneal surface 2. Pressure chamber 6 is in communication with a piston 10 which is motivated by a rotary solenoid 12 or other actuation means for the purpose of generating pulsated discharges of air through orifice tube 8. Chamber 6 is partly defined by a transparent window 14 and by a lens system 16 disposed coaxially with orifice tube 8. A beam splitter 18, a reticule 20 and a lens or eyepiece 22 are disposed in the optical path between observer 4 and corneal surface 2.

The alignment system for this apparatus is essentially an optical spherometer arrangement including an alignment light source 24, and a lens 26 and reticule 28 to direct the light from source 24 onto beam splitter 18, thence to lens 8 in a known manner of alignment.

Referring now to FIG. 2, the monitoring system is shown somewhat schematically. The monitoring system is disposed about the optical axis of the system and is generally disposed in a horizontal plane to minimize interference from eyelids. A light source 30 is directed toward corneal surface 2 through a condenser 32, pinhole 34 and collimator 36. Along the line of the reflected light beam, a suitable lens 38, a pinhole 40, a light detector 42 and a detector information readout instrument 44 are typically employed. Light detector 42 senses the reflected light flux from corneal surface 2 and readout instrument 44 typically plots this quantity (the ordinate) as a function of time (the abscissa). One example of such a readout instrument for plotting relative values as a function of time is an oscilloscope.

In operation, as solenoid 12 actuates piston 10 to create air pressure within chamber 6 and the air in chamber 6 consequently exits, in a pulse of very short duration, through orifice tube 8, this pulse is directed against an area of the corneal surface 2. The corneal surface area is thus caused to deform from its normal convex configuration to a plane surface area and beyond to concavity. The pulse generator operation, that is, the piston 10 and the size of orifice 8 have been designed to provide a highly reliable force-time relationship as shown on the curve of FIG. 3. When the pulse force decreases, the corneal surface area then returns from its concavity through applanation to its normal or convex configuration. Throughout this process and during this transition, light from source 30 is continuously reflected from the corneal surface and indicated by instrument 44. It will be apparent that light flux reflected from a convex surface, from a concave surface, and from a plane surface will appear to the sensor to be of varying quantities, with maxima appearing at occurrences of applanation. Due to the location of pinhole 40 in the focal plane of lens 38, only that reflected light parallel to the axis of the lens will pass through the pinhole to the detector 42. This renders the monitoring system most sensitive to the occurrences of applanation.

FIG. 4 is a curve of reflected light detector output plotted as a function of time, the quantities of the reflected light beam being sensed during the time cycle of the corneal surface above described. The peaks shown represent reflection maxima, which in turn represent occurrences of applanation of the corneal surface. The time of these occurrences of applanation is indicated along the abscissa of the curve. Time period A is an interval between a reference or starting time, as represented by the peak S which results when a switch initiates the process, and the first occurrence of applanation. Time period B is the interval between first and second occurrences. Time period C is the interval between the reference time and the second occurrence of applanation. Any one of these time periods or all of them can be correlated to intraocular pressure and calibrated to be a measure of the same.

FIG. 5 is a superposition of FIG. 4 on FIG. 3, the abscissas being common to both curves. Bearing in mind that the peaks of FIG. 4 represent time occurrences of applanation, it will be appreciated that first applanations (FIG. 4 curve) occurring more closely to the force peak (FIG. 3 curve) indicate a greater force required than, for example, a first applanation suggested by the dotted curve. In addition, a second applanation occurring more closely to the force peak indicates a greater return force (intraocular pressure) than does the second applanation suggested by the dotted curve.

The time cycle involved in this procedure is in terms of milliseconds. Because of this, the examination is not accompanied by the discomfort that attends all other methods of tonometry. Accordingly, the procedure can be carried out without corneal anesthesia and thus can be employed by all practitioners and not limited to those only who are also licensed to administer anesthetics.

It will be apparent that a method of tonometry and an apparatus therefor has herein been described which measures intraocular pressure by a novel method and by parameters which are new to the art. By use of the present method and apparatus, the limitations and criticalities of former methods, such as measurement of corneal deformation and the necessity of corneal anesthesia are overcome. The present method is simply a measurement of time interval between two well-identified events.

It may occur to others of ordinary skill in the art to make modifications of the present invention which will lie within the concept and scope thereof and not constitute a departure therefrom. Accordingly, it is intended that the invention be not limited by the details in which it has been described, but that it encompass all within the purview of the following claims.

What I claim is:

1. A method of tonometry by which, without contact between apparatus and cornea, intraocular pressure is indicated, including the steps of:
    directing a fluid force against a corneal surface area, such force being sufficient to transfigure said surface area from convexity to a concavity,
    directing a monitoring light beam at said corneal surface area,
    receiving the reflection of said beam in a detecting apparatus, and
    detecting the quantities of flux of said reflection as a function of the time during which said corneal surface area is transfigured from convexity, through applanation, to concavity, and back through applanation to convexity, whereby the time between the directing of the fluid force against said corneal surface and the occurring of the first applanation of said corneal surface or the time between the first and second applanations may be correlated to the intraocular pressure.

2. The method of tonometry as defined in claim 1 in which said fluid force is directed toward said corneal surface area in a direction substantially normal thereto and said monitoring light beam is directed toward said corneal surface area in a direction other than normal thereto.

3. Apparatus for the measurement of intraocular pressure including:
    means for directing a fluid pulse against a corneal surface area in order to transfigure said area from convexity, through applanation to concavity;
    a light source to direct a light beam at said surface area; and
    a reflection detection means to detect and indicate quantities of flux reflection as a function of the time during which said corneal surface is transfigured from convexity, through applanation, to concavity.

4. Apparatus according to claim 3 further including means to align said apparatus to direct said fluid pulse in a direction normal to said surface area.

5. Apparatus according to claim 3 in which:
    said pulse generator comprises a solenoid actuated plunger operatively associated with an orificed pressure chamber to provide uniform pulses successively; and
    said reflection detection means comprises a light detector and a detector readout instrument to indicate relative quantities of detected light as a function of time.

6. A method of noncontact tonometry including the steps of:
    directing a fluid force along a first axis against a corneal surface, such force being sufficient to transfigure said surface area from convexity through applanation to concavity;
    directing a monitoring light beam along a second axis angularly displaced from said first axis and at said corneal surface area;
    receiving the reflection of said beam in a photosensitive detecting apparatus;
    recording the quantities of flux of said reflection continuously during the foregoing steps; and
    plotting the relative quantities thus recorded as a function of the time during which said corneal surface area is transfigured from convexity through applanation to concavity and back through applanation to convexity, whereby the time between the directing of the fluid force against said corneal surface and the occurring of the first applanation of said corneal surface or the time between the first and second applanations may be correlated to intraocular pressure.

7. Apparatus for measurement of the intraocular pressure including:
    means for directing a fluid pulse against a corneal surface area along a first axis normal to said area in order to transfigure said area from convexity, through applanation to concavity;
    a light source;
    means to direct a beam from said light source along a second axis angularly displaced from said first axis and at said surface area;
    a photosensitive reflection detection means to detect quantities of reflected light flux from said surface area;
    said light source and said reflection detection means disposed on opposite sides of said pulse directing means and at equal angles from the normal to said surface area; and
    recording means to continuously plot relative quantities of detected flux reflection as a function of time before, during and after which said fluid pulse directing means is operative relative to said corneal surface area.